United States Patent
Fyke

(10) Patent No.: US 10,657,730 B2
(45) Date of Patent: *May 19, 2020

(54) METHODS AND DEVICES FOR MANIPULATING AN IDENTIFIED BACKGROUND PORTION OF AN IMAGE

(71) Applicant: BlackBerry Limited, Waterloo (CA)

(72) Inventor: Steven Henry Fyke, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/392,803

(22) Filed: Apr. 24, 2019

(65) Prior Publication Data
US 2019/0251756 A1 Aug. 15, 2019

Related U.S. Application Data

(63) Continuation of application No. 15/409,713, filed on Jan. 19, 2017, now Pat. No. 10,319,152, which is a
(Continued)

(51) Int. Cl.
*G06T 19/20* (2011.01)
*H04N 13/239* (2018.01)
(Continued)

(52) U.S. Cl.
CPC ............ *G06T 19/20* (2013.01); *G06K 9/4604* (2013.01); *G06K 9/6267* (2013.01); *G06T 11/60* (2013.01);
(Continued)

(58) Field of Classification Search
CPC ..... G06T 19/20; G06T 11/60; G06T 2200/24; G06K 9/6267; G06K 9/4604; H04N 13/286; H04N 13/239; H04N 2013/0092
See application file for complete search history.

(56) References Cited

U.S. PATENT DOCUMENTS 5,880,858 A 3/1999 Jin
7,133,571 B2 11/2006 Cheatle
(Continued)

FOREIGN PATENT DOCUMENTS

| EP | 2 333 692 | 6/2011 |
|---|---|---|
| EP | 2 395 761 | 12/2011 |
| WO | WO96/31047 | 10/1996 |

OTHER PUBLICATIONS

O'Reilly Answers: How to Remove Objects from an Image's Background using Photoshop Elements 8, retrieved from http://answers.oreilly.com/topic/1639-how-to-remove-objects-from-an-image-background, posted on Jun. 18, 2010.
(Continued)

*Primary Examiner* — Maurice L. McDowell, Jr.
(74) *Attorney, Agent, or Firm* — Rowand LLP

(57) ABSTRACT

Methods and devices for selecting objects in images are described. In one example aspect, a method includes: receiving stereoscopic image data, the stereoscopic image data includes a first image obtained from a first camera and a second image obtained from a second camera; identifying an object in the first image by analyzing the first image and the second image; displaying the first image, the identified object in the first image being selectable.

20 Claims, 5 Drawing Sheets

Related U.S. Application Data continuation of application No. 13/406,595, filed on Feb. 28, 2012, now Pat. No. 9,558,575.

(51) Int. Cl.

| | | |
|---|---|---|
| *G06T 11/60* | (2006.01) | |
| *H04N 13/286* | (2018.01) | |
| *G06K 9/46* | (2006.01) | |
| *G06K 9/62* | (2006.01) | |
| *H04N 13/00* | (2018.01) | |

(52) U.S. Cl.
CPC ......... *H04N 13/239* (2018.05); *H04N 13/286* (2018.05); *G06T 2200/24* (2013.01); *H04N 2013/0092* (2013.01)

(56) References Cited

U.S. PATENT DOCUMENTS

| | | | |
|---|---|---|---|
| 7,697,786 | B2 | 4/2010 | Camus et al. |
| 7,835,568 | B2 | 11/2010 | Park et al. |
| 9,558,575 | B2 * | 1/2017 | Fyke .................. G06T 11/60 |
| 10,319,152 | B2 * | 6/2019 | Fyke .................. G06T 11/60 |
| 2008/0193006 | A1 | 8/2008 | Udupa et al. |
| 2008/0225044 | A1 | 9/2008 | Huang et al. |
| 2009/0010507 | A1 | 1/2009 | Geng |
| 2009/0290786 | A1 | 11/2009 | Stevens et al. |
| 2010/0001996 | A1 | 1/2010 | Shen et al. |
| 2010/0098328 | A1 | 4/2010 | Se et al. |
| 2010/0194860 | A1 | 8/2010 | Mentz et al. |
| 2011/0044531 | A1 | 2/2011 | Zhang et al. |
| 2011/0135194 | A1 | 6/2011 | Izumi |
| 2012/0033039 | A1 | 2/2012 | Saski et al. |
| 2013/0051673 | A1 | 2/2013 | Wernersson et al. |

OTHER PUBLICATIONS

3D-Doctor: 3D Imaging, Modeling and Measurement on Your PC, www.3d-doctor.com, retrieved on Apr. 7, 2003.

John Edwards et al.: "Live Mesh: An Interactive 3D Image Segmentation Tool", published in 2008.

Amira Online Help: Editor: ImageCrop Editor (Amira), retrieved from http://walnutzib.de/documentation/521/amira/hxlattice/HxImageCrop.html, retrieved on Nov. 8, 2011.

The British Machine Vision Association and Society for Pattern Recognition, BMVA: "Object Segmentation", retrieved from www.bmva.org/w/vt:object-segmentation, retrieved on Nov. 8, 2011.

ITK-SNAP Home Page, retrieved from www.itksnap.org/pmwiki/pmwiki.php, retrieved on Nov. 8, 2011.

Three Pane Crop, PlugIn for ImageJ, retrieved from http://www.longair.net/edinburgh/imagej/three-pane-corp, retrieved on Nov. 8, 2011.

Denis Bakin: "Stereoscopy on Complex Scenes and Edge Detection" retrieved from www.okob.net/texts/mydocuments/stereoscopy, retrieved on Nov. 9, 2011.

Barrett W. A. et al., "Object-based image editing", Computer Graphics Proceedings, Jan. 1, 2002, pp. 1-8.

Extended European Search Report dated Jul. 3, 2012, EP12157238.2.

CIPO, CA Office Action relating to Application No. 2,802,622, dated May 19, 2015.

USPTO, Office Action relating to U.S. Appl. No. 15/409,713, dated Jul. 23, 2018.

USPTO, Final Office Action relating to U.S. Appl. No. 15/409,713, dated Nov. 30, 2018.

USPTO, Notice of Allowance relating to U.S. Appl. No. 15/409,713, dated Jan. 28, 2019.

\* cited by examiner

METHODS AND DEVICES FOR MANIPULATING AN IDENTIFIED BACKGROUND PORTION OF AN IMAGE

CROSS-REFERENCE TO RELATED APPLICATIONS

This application is a continuation of U.S. patent application Ser. No. 15/409,713, filed on Jan. 19, 2017, which is a continuation of U.S. patent application Ser. No. 13/406,595 filed Feb. 28, 2012. The entirety of the above-referenced applications are incorporated herein by reference.

TECHNICAL FIELD

The present disclosure relates to image manipulation, and more particularly, to methods and electronic devices for selecting objects in images.

BACKGROUND

Electronic devices such as smartphones and tablet computers may be equipped with an application to manipulate images. For example, an image editing application may allow a user to manipulate an image by changing properties associated with the image. The image editing application may, for example, allow a user to modify the visual properties of the image by removing portions of the image, changing the colour of portions of the image, adding graphics to the image, etc.

An image editing application may not provide a user with an easy way of selecting objects within an image for manipulating the image. An object may include an identifiable item, such as an individual, within an image. A user desiring to select an object within an image may have to manually outline the boundaries around the object in order to select the object. This can be a cumbersome process and may not accurately capture the whole object within the image.

BRIEF DESCRIPTION OF THE DRAWINGS

Reference will now be made, by way of example, to the accompanying drawings which show an embodiment of the present application, and in which.

Like reference numerals are used in the drawings to denote like elements and features.

DETAILED DESCRIPTION OF EXAMPLE EMBODIMENTS

In one example aspect, the present application describes a method implemented by a processor of an electronic device for allowing selection of an object in an image. The method includes: receiving stereoscopic image data, the stereoscopic image includes a first image obtained from a first camera and a second image obtained from a second camera; identifying an object in the first image by analyzing the first image and the second image; displaying the first image, the identified object in the first image being selectable.

In another example aspect, the present application describes an electronic device. The electronic device includes a memory, a display, a first camera, a second camera, and a processor coupled with the memory, the display, the first camera, and the second camera. The processor is configured to: receive stereoscopic image data, the stereoscopic image data includes a first image obtained from the first camera and a second image obtained from the second camera; identifying an object in the first image by analyzing the first image and the second image; display the first image on the display, the identified object in the first image being selectable.

In yet another example aspect, the present application describes a computer readable storage medium. The computer readable storage medium includes computer executable instructions for allowing selection of an object in an image. The computer executable instructions includes instructions for: receiving stereoscopic image data, the stereoscopic image data includes a first image obtained from a first camera and a second image obtained from a second camera; identifying an object in the first image by analyzing the first image and the second image; displaying the first image, the identified object in the first image being selectable.

Other example embodiments of the present disclosure will be apparent to those of ordinary skill in the art from a review of the following detailed description in conjunction with the drawings.

Example embodiments of the present disclosure are not limited to any particular operating system, electronic device architecture, server architecture or computer programming language.

Example Electronic Device

Figure 1:
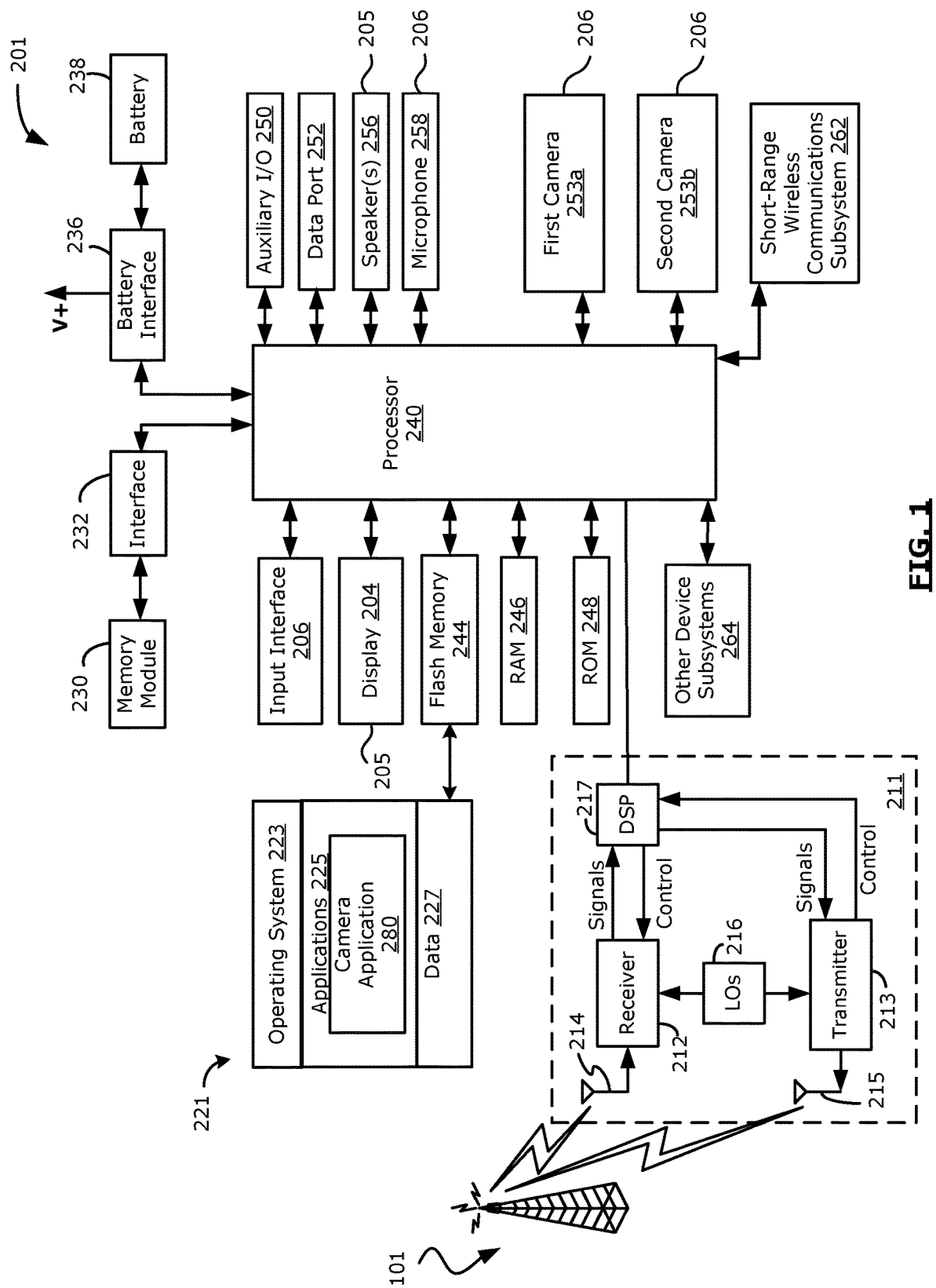
FIG. 1 is a block diagram illustrating an example electronic device in accordance with example embodiments of the present disclosure.

Reference is first made to FIG. 1 which illustrates an example electronic device 201 in which example embodiments described in the present disclosure can be applied. In the example embodiment illustrated, the electronic device 201 is a mobile communication device. That is, the electronic device 201 is configured to communicate with other electronic devices, servers and/or systems (i.e. it is a "communication" device) and the electronic device 201 is portable and may be easily moved between different physical locations (i.e. it is a "mobile" device). However, in other example embodiments, the electronic device 201 may not be portable (i.e. may not be a "mobile" device) and/or may not be configured to communicate with other systems (i.e. may not be a "communication" device).

Depending on the functionality provided by the electronic device 201, in various example embodiments the electronic device 201 may be a multiple-mode communication device configured for both data and voice communication, a mobile telephone such as a smartphone, a wearable computer such as a watch, a tablet computer such as a slate computer, a personal digital assistant (PDA), or a computer system. The electronic device 201 may take other forms apart from those specifically listed above. The electronic device 201 may also, in various example embodiments, be referred to as a mobile communications device, a communication device, a mobile device, an electronic device and, in some cases, as a device.

The electronic device 201 includes a controller including at least one processor 240 (such as a microprocessor) which controls the overall operation of the electronic device 201. The processor 240 interacts with device subsystems such as a wireless communication subsystem 211 for exchanging radio frequency signals with a wireless network 101 to perform communication functions. The processor 240 may be communicably coupled with additional device subsystems including one or more output interfaces 205 (such as a display 204 and/or a speaker 256), one or more input interfaces 206 (such as a first camera 253a, a second camera 253b, a microphone 258, a keyboard (not shown), control buttons (not shown), a touch-sensitive overlay (not shown) associated with a touchscreen display and/or other input interfaces 206), memory (such as flash memory 244, random access memory (RAM) 246, read only memory (ROM) 248, etc.), auxiliary input/output (I/O) subsystems 250, a data port 252 (which may be a serial data port, such as a Universal Serial Bus (USB) data port), a short-range wireless communication subsystem 262 and other device subsystems generally designated as 264. Some of the subsystems shown in FIG. 1 perform communication-related functions, whereas other subsystems may provide "resident" or on-device functions.

In at least some example embodiments, the electronic device 201 may include a touchscreen display which acts as both an input interface 206 (i.e. touch-sensitive overlay) and an output interface 205 (i.e. display). The touchscreen display may be constructed using a touch-sensitive input surface which is connected to an electronic controller and which overlays the display 204. The touch-sensitive overlay and the electronic controller provide a touch-sensitive input interface 206 and the processor 240 interacts with the touch-sensitive overlay via the electronic controller.

The electronic device 201 may include a communication subsystem 211 which allows the electronic device 201 to communicate over a wireless network 101. The communication subsystem 211 includes a receiver 212, a transmitter 213, and associated components, such as one or more antenna elements 214, 215, local oscillators (LOs) 216, and a processing module such as a digital signal processor (DSP) 217. The antenna elements 214, 215 may be embedded or internal to the electronic device 201 and a single antenna may be shared by both receiver 212 and transmitter 213. The particular design of the wireless communication subsystem 211 depends on the wireless network 101 in which the electronic device 201 is intended to operate.

In at least some example embodiments, the electronic device 201 may communicate with any one of a plurality of fixed transceiver base stations of the wireless network 101 within its geographic coverage area. The electronic device 201 may send and receive communication signals over the wireless network 101 after the required network registration or activation procedures have been completed. Signals received by the antenna 214 through the wireless network 101 are input to the receiver 212, which may perform such common receiver functions as signal amplification, frequency down conversion, filtering, channel selection, etc., as well as analog-to-digital (A/D) conversion. A/D conversion of a received signal allows more complex communication functions such as demodulation and decoding to be performed in the DSP 217. In a similar manner, signals to be transmitted are processed, including modulation and encoding, for example, by the DSP 217. These DSP-processed signals are input to the transmitter 213 for digital-to-analog (D/A) conversion, frequency up conversion, filtering, amplification, and transmission to the wireless network 101 via the antenna 215. The DSP 217 not only processes communication signals, but may also provide for receiver 212 and transmitter 213 control. For example, the gains applied to communication signals in the receiver 212 and the transmitter 213 may be adaptively controlled through automatic gain control algorithms implemented in the DSP 217.

In at least some example embodiments, the auxiliary input/output (I/O) subsystems 250 may include an external communication link or interface; for example, an Ethernet connection. The electronic device 201 may include other wireless communication interfaces for communicating with other types of wireless networks; for example, a wireless network such as an orthogonal frequency division multiplexed (OFDM) network. The auxiliary I/O subsystems 250 may include a vibrator for providing vibratory notifications in response to various events on the electronic device 201 such as receipt of an electronic communication or incoming phone call, or for other purposes such as haptic feedback (touch feedback).

In at least some example embodiments, the electronic device 201 also includes a removable memory module 230 (which may be flash memory, such as a removable memory card) and a memory interface 232. Network access may be associated with a subscriber or user of the electronic device 201 via the memory module 230, which may be a Subscriber Identity Module (SIM) card for use in a GSM network or other type of memory card for use in the relevant wireless network type. The memory module 230 is inserted in or connected to the memory card interface 232 of the electronic device 201 in order to operate in conjunction with the wireless network 101.

The data port 252 may be used for synchronization with a user's host computer system (not shown). The data port 252 enables a user to set preferences through an external device or software application and extends the capabilities of the electronic device 201 by providing for information or software downloads to the electronic device 201 other than through the wireless network 101. The alternate download path may for example, be used to load an encryption key onto the electronic device 201 through a direct, reliable and trusted connection to thereby provide secure device communication.

The electronic device 201 includes a first camera 253a and a second camera 253b. The cameras 253a, 253b are capable of capturing camera data, such as images, in the form of still photo and/or motion data. The camera data may be captured in the form of an electronic signal which is produced by an image sensor associated with each of the cameras 253a, 253b. The cameras 253a, 253b may be collectively capable of capturing stereoscopic images for display. That is, the cameras 253a, 253b may collectively produce stereoscopic image data which defines a stereoscopic image. Stereoscopic images may provide an illusion of depth in the images to a user (i.e. three dimensional (3-D) images).

To produce stereoscopic image data, the cameras 253a, 253b are oriented in generally the same direction. For example, as will be discussed below, in at least some embodiments, the cameras 253a, 253b may both be rear-facing. That is, the cameras 253a, 253b are, in some embodiments, both arranged to capture an image of a subject on a rear side of the electronic device 201.

The first camera 253a and the second camera 253b are mounted in spaced relation to one another. That is, there may be a space between the cameras 253a, 253b. The first camera 253a and the second camera 253b are spaced apart in order to capture stereoscopic images. The distance between the cameras may be approximately the same as the distance between a standard person's eyes (which is around 6.35 cm). In at least some example embodiments, the distance between the cameras may be smaller or larger than the distance between a person's eyes. A larger distance between the cameras may allow for capturing stereoscopic images that produces an enhanced effect of stereoscopy for a user.

Since the cameras 253a, 253b are offset from one another, so too are the images which they produce. That is, the first camera 253a captures a first image, and the second camera 253b captures a second image that is offset from the first image. The first image is captured at a different position than the second image due to the positioning of the first camera 253a and the second camera 253b. The offset between the first image and the second image is defined by the distance (referred to as the intra-axial distance) between the first camera 253a and the second camera 253b.

Accordingly, stereoscopic image data may be produced by the cameras 253a, 253b. Such stereoscopic image data includes two images—a first image produced using the first camera 253a, and a second image produced using the second camera 253b. The first image and the second image may be captured at the same time or approximately the same time, but may be offset in appearance due to the spacing between the cameras 253a, 253b.

The cameras 253a, 253b may be both configured as front facing cameras or may both be configured as rear facing cameras. Front facing cameras are provided by cameras 253a, 253b which are located to obtain images near a front face of the electronic device 201. The front face is typically the face on which a main display 204 is mounted. That is, when front facing cameras are provided on the electronic device 201, the display 204 is configured to display content which may be viewed from a side of the electronic device 201 where the cameras 253a, 253b are directed.

The cameras 253a, 253b of the front facing cameras may be located above or below the display 204. In at least some example embodiments, the camera 253a, 253b may be provided in a central location relative to the display 204 to facilitate image acquisition of a face. For example, the cameras 253a, 253b may be located centrally above the display 204.

Rear facing cameras are provided by cameras 253a, 253b which are located to obtain images of a subject near a rear face of the electronic device 201. The rear face is typically a face which does not include the main display 204 of the electronic device 201. In at least some embodiments, the electronic device 201 may operate in one operating mode in which the display 204 acts as a viewfinder displaying image data associated with rear facing cameras.

The rear facing cameras may obtain images which are not within the field of view of the front facing cameras. The field of view of the front facing and rear facing cameras may generally be in opposing directions.

While FIG. 1 illustrates a first camera 253a and a second camera 253b, the electronic device 201 may include more than two cameras 253a, 253b. For example, in at least some example embodiments, the electronic device 201 may include both front facing cameras and rear facing cameras.

In at least some example embodiments, the electronic device 201 is provided with a service routing application programming interface (API) which provides an application with the ability to route traffic through a serial data (i.e., USB) or Bluetooth® (Bluetooth® is a registered trademark of Bluetooth SIG, Inc.) connection to a host computer system using standard connectivity protocols. When a user connects their electronic device 201 to the host computer system via a USB cable or Bluetooth® connection, traffic that was destined for the wireless network 101 is automatically routed to the electronic device 201 using the USB cable or Bluetooth® connection. Similarly, any traffic destined for the wireless network 101 is automatically sent over the USB cable or Bluetooth® connection to the host computer system for processing.

The electronic device 201 also includes a battery 238 as a power source, which is typically one or more rechargeable batteries that may be charged for example, through charging circuitry coupled to a battery interface 236 such as the data port 252. The battery 238 provides electrical power to at least some of the electrical circuitry in the electronic device 201, and the battery interface 236 provides a mechanical and electrical connection for the battery 238. The battery interface 236 is coupled to a regulator (not shown) which provides power V+ to the circuitry of the electronic device 201.

The electronic device 201 stores data 227 in an erasable persistent memory, which in one example embodiment is the flash memory 244. In various example embodiments, the data 227 includes service data including information used by the electronic device 201 to establish and maintain communication with the wireless network 101. The data 227 may also include user application data such as email messages, address book and contact information, camera data, calendar and schedule information, notepad documents, image files, and other commonly stored user information stored on the electronic device 201 by its user, and other data. The data 227 stored in the persistent memory (e.g. flash memory 244) of the electronic device 201 may be organized, at least partially, into one or more databases or data stores. The databases or data stores may contain data items of the same data type or associated with the same application. For example, email messages, contact records, and task items may be stored in individual databases within the memory.

The electronic device 201 may, in at least some example embodiments, be a mobile communication device which may provide two principal modes of communication: a data communication mode and a voice communication mode. In the data communication mode, a received data signal such as a text message, an email message, or a web page download will be processed by the communication subsystem 211 and input to the processor 240 for further processing. For example, a downloaded web page may be further processed by a browser application or an email message may be processed by an email messaging application and output to the display 204. A user of the electronic device 201 may also compose data items, such as email messages, for example, using the input devices in conjunction with the display 204. These composed items may be transmitted through the wireless communication subsystem 211 over the wireless network 101.

In the voice communication mode, the electronic device 201 provides telephony functions and operates as a typical cellular phone. The overall operation is similar to the data communication mode, except that the received signals would be output to the speaker 256 and signals for transmission would be generated by a transducer such as the microphone 258. The telephony functions are provided by a combination of software/firmware (i.e., a voice communication module) and hardware (i.e., the microphone 258, the speaker 256 and input interfaces 206). Alternative voice or audio I/O subsystems, such as a voice message recording subsystem, may also be implemented on the electronic device 201. Although voice or audio signal output is typically accomplished primarily through the speaker 256, the display 204 may also be used to provide an indication of the identity of a calling party, duration of a voice call, or other voice call related information.

The processor 240 operates under stored program control and executes software modules 221 stored in memory such as persistent memory; for example, in the flash memory 244. As illustrated in FIG. 1, the software modules 221 include operating system software 223 and other software applications 225.

The software applications 225 on the electronic device 201 may also include a range of additional applications including, for example, a notepad application, Internet browser application, voice communication (i.e. telephony) application, mapping application, or a media player application, or any combination thereof. Each of the software applications 225 may include layout information defining the placement of particular fields and graphic elements (e.g. text fields, input fields, icons, etc.) in the user interface (e.g. the display 204) according to the application.

The software modules 221 or parts thereof may be temporarily loaded into volatile memory such as the RAM 246. The RAM 246 is used for storing runtime data variables and other types of data or information, as will be apparent. Although specific functions are described for various types of memory, this is merely one example, and it will be appreciated that a different assignment of functions to types of memory could also be used.

A predetermined set of applications that control basic device operations, including data and possibly voice communication applications will normally be installed on the electronic device 201 during or after manufacture. Additional applications and/or upgrades to the operating system 223 or software applications 225 may also be loaded onto the electronic device 201 through the wireless network 101, the auxiliary I/O subsystem 250, the data port 252, the short-range communication subsystem 262, or other suitable device subsystem 264. The downloaded programs or code modules may be permanently installed, for example, written into the program memory (i.e. the flash memory 244), or written into and executed from the RAM 246 for execution by the processor 240 at runtime.

The processor 240 may be electrically connected to the cameras 253a, 253b to allow the processor 240 to receive electronic signals representing camera data from the cameras 253a, 253b.

In at least some embodiments, the software modules 221 may include one or more camera applications 280 or software modules which are configured for handling the electronic signals representing camera data from the cameras 253a, 253b. The camera application 280 may, for example, be configured to provide a viewfinder on the display 204 by displaying, in real time or near real time, images defined in the electronic signals received from the cameras 253a, 253b. The camera application 280 may also be configured to capture images or videos by storing images or videos defined by the electronic signals received from the cameras 253a, 253b. For example, the camera application 280 may be configured to store the images or videos to memory, for example the flash memory 244, of the electronic device 201. The images may be stored in various formats including JPEG, RAW, BMP etc.

The camera application 280 may also be configured to control options or preferences associated with the cameras 253a, 253b. For example, the camera application 280 may be configured to control camera lens apertures and/or shutter speeds associated with the cameras 253a, 253b. The control of such features may, in at least some embodiments, be automatically performed by the camera application 280 based on output received from a light exposure meter.

In at least some example embodiments, the camera application 280 may be configured to control flashes associated with the cameras 253a, 253b and/or to control zooms associated with the cameras 253a, 253b. In at least some example embodiments, the camera application 280 is configured to provide digital zoom features. The camera application 280 may provide digital zoom features by cropping an image down to a centered area with the same aspect ratio as the original. In at least some example embodiments, the camera application 280 may interpolate within the cropped image to bring the cropped image back up to the pixel dimensions of the original. The camera application 280 may, in at least some example embodiments, provide image stabilization for the cameras 253a, 253b. Image stabilization may reduce blurring associated with movement of the cameras 253a, 253b.

In at least some embodiments, the camera application 280 may be configured to focus the cameras 253a, 253b on an object (i.e. an identifiable item, such as an individual or thing). More particularly, the camera application 280 may be configured to control actuators of the cameras 253a, 253b to move lenses (a lens may be comprised of one or more lens elements) in the camera 253a, 253b relative to image sensors in the cameras 253a, 253b. For example, when capturing images of objects which are very close to the cameras 253a, 253b (e.g. object at macro position), the camera application 280 may control the actuators to cause the actuators to move the lenses away from the image sensors.

In at least some embodiments, the camera application 280 may provide for auto-focusing capabilities. For example, the camera application 280 may analyze received electronic signals to determine whether the images captured by the cameras are in focus. That is, the camera application 280 may determine whether the images defined by electronic signals received from the cameras 253a, 253b are focused properly on the object of such images. The camera application 280 may, for example, make this determination based on the sharpness of such images. If the camera application 280 determines that the images are not in focus, then the camera application 280 may cause the processor 240 to adjust the actuators which controls the lenses to focus the images.

In at least some example embodiments, the camera application 280 (or another application 225) may be configured to process electronic signals of images captured by cameras 253a, 253b for stereoscopic display. That is, the camera application 280 may analyze stereoscopic images defined by the electronic signals received from the cameras 253a, 253b.

In at least some embodiments, the camera application 280 may be configured to display a first image (obtained from a first camera 253a) and a second image (obtained from a second camera 253b) separately to a left eye and a right eye of a user viewing the display 204. That is, the first image may be displayed to only the left eye of the user and the second image may be displayed to only the right eye of the user. The offset between the first image and the second image may provide information to the brain of a user to give the perception of depth when the first image and the second image are combined (i.e. stereoscopic images), and viewed by the user.

Accordingly, in one operating mode, the camera application 280 may be configured to display stereoscopic images defined by stereoscopic image data to a user via the display 204 to achieve a stereoscopic effect. The camera application 280 may employ any one of a number of stereoscopic display techniques in order to achieve the stereoscopic effect. In at least some example embodiments, the stereoscopic images are displayed as alternate-frame sequencing. Alternative-frame sequencing occurs when the display 204 alternatively displaying a different image for each eye of a user. That is, a first image for the left eye is displayed, and then a second image for the right eye is displayed. In such example embodiments, a user may wear 3-D liquid crystal glasses in order to experience the effect of stereoscopy when viewing the stereoscopic images. In some embodiments, the 3-D liquid crystal glasses may include a communication subsystem for receiving timing signals from the electronic device 201. The timing signals control the visibility of the 3-D liquid crystal glasses. For example, the timing signals may allow the 3-D liquid crystal glasses to alternatively darken over one eye and then the other eye, in synchronization with a refresh rate (i.e. the rate at which the images are alternatively displayed) of the display 204. A user wearing a 3-D liquid crystal glass may view a first image with only the left eye and then alternatively view a second image with only the right eye, experiencing the effect of stereoscopy.

In some example embodiments, the stereoscopic images are displayed through polarizing filters on the display 204. The polarizing filters are optical filters that allow light of a specific polarization to pass through and prevent light of other polarization to pass through. The polarizing filters may be placed underneath the display 204. The stereoscopic images are displayed superimposed through the polarizing filters on the display 204. In such example embodiments, a user may wear 3-D polarized glasses in order to experience the effect of stereoscopy when viewing the stereoscopic images. The 3-D polarized glasses contain a pair of different polarizing filters. Each polarizing filter on the 3-D polarized glass passes light that is similarly polarized to the light passing through the polarizing filters on the display 204, and blocks light that is not similarly polarized to the light passing through the polarizing filters on the display 204. For example, a 3-D polarizing glass with a blue light polarizing filter for a first lens, and an alternate red light polarizing filter for the a second lens, allows only blue light transmitted from the display 204 to pass through the first lens and only red light transmitted from the display 204 to pass through the second lens. A user wearing a 3-D polarized glass may view the superimposed images simultaneously, experiencing the effect of stereoscopy.

In other example embodiments, the stereoscopic images are displayed as auto-stereoscopy. Auto-stereoscopy provides a user viewing stereoscopic images to experience the effect of stereoscopy without having to wear any form of 3-D glasses. In such example embodiments, the images displayed on the display 204 are split directionally into a user's eyes. That is, a first image is only viewed by a user's left eye and a second image is only viewed by a user's right eye. In such example embodiments, a parallax barrier may be implemented to split the view of the images. The parallax barrier may overlay the display 204, and include a series of slits allowing each eye of a user to view a specific image. A user viewing the images may experience the effect of stereoscopy.

It will be appreciated that stereoscopic images may be presented by the electronic device 201 on the display 204 in order for a user to experience the effect of stereoscopy when viewing the images by other example embodiments not specifically described herein.

In at least some example embodiments, the camera application 280 may be configured to allow for simultaneous operation of the cameras 253a, 253b. That is, the camera application 280 may allow the cameras 253a, 253b to simultaneously capture images. For example, a user may input an instruction to the electronic device 201 via an input interface 206 instructing the electronic device 201 to capture an image. In response, the electronic device 201 may simultaneously capture an image using both the first camera 253a and the second camera 253b; a first image is captured using the first camera 253a and a second image is captured using the second camera 253b. The first image and the second image may be captured at approximately the same time. These images may collectively form stereoscopic image data.

In at least some embodiments, the camera application 280 (or another application 225) may be configured to allow selection of an identified object in an image. Objects may be identified by the camera application 280 (or another application 225) using stereoscopic image data (which includes a first image obtained from a first camera 253a and a second image obtained from a second camera 253b). In some embodiments, in response to receiving the stereoscopic image data from the cameras 253a, 253b, the camera application 280 analyzes the first image and the second image to identify an object in the first image. The camera application 280 (or another application, such as an image editing application) may be configured to then display the first image as a two dimensional (i.e. non stereoscopic) image, and to allow selection of the identified object in the first image. Specific functions and features of the camera application 280 will be discussed in greater detail below with reference to FIGS. 4 to 6.

While the embodiment discussed above includes a processor 240 coupled with a camera application 280 which collectively act as an image signal processor to provide image related functions such as auto-focusing, in other example embodiments (not shown), another processor such as a dedicated image signal processor, may provide some or all of these functions.

In at least some example embodiments, the operating system 223 may perform some or all of the functions of the camera application 280. In other example embodiments, the functions or a portion of the functions of the camera application 280 may be performed by one or more other applications. For example, in at least some embodiments, the manipulation functions and/or the identification of objects (which will be described below in greater detail with reference to FIGS. 4 to 6) may be performed within an image editing application (not shown). The image editing application may be an application which allows a user to edit an image. The image editing application may contain processor executable instructions which, when executed, cause the processor 240 to perform object manipulation and/or object identification.

Further, while the camera application 280 has been illustrated as a stand-alone application, in other example embodiments, the camera application 280 may be implemented as part of the operating system 223 or another application 225. Furthermore, in at least some example embodiments, the functions of the camera application 280 may be provided by a plurality of software modules. In at least some example embodiments, these software modules may be divided among multiple applications.

Example Smartphone Electronic Device

As discussed above, the electronic device 201 may take a variety of forms. For example, in at least some example embodiments, the electronic device 201 may be a smartphone.

Figure 2:
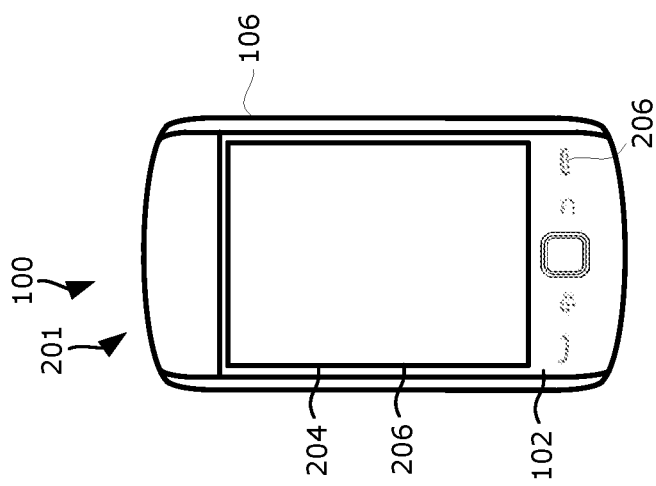
FIG. 2 is a front view of an example smartphone in accordance with example embodiments of the present disclosure.

Referring now to FIG. 2, a front view of an example electronic device 201 which is a smartphone 100 is illustrated. The smartphone 100 is a mobile phone which offers more advanced computing capability than a basic non-smartphone cellular phone. For example, the smartphone 100 may have the ability to run third party applications which are stored on the smartphone.

The smartphone 100 may include the components discussed above with reference to FIG. 1 or a subset of those components. The smartphone 100 includes a housing 106 which houses at least some of the components discussed above with reference to FIG. 1.

In the example embodiment illustrated, the smartphone 100 includes a display 204, which may be a touchscreen display which acts as an input interface 206. The display 204 is disposed within the smartphone 100 so that it is viewable at a front side 102 of the smartphone 100. That is, a viewable side of the display 204 is disposed on the front side 102 of the smartphone. In the example embodiment illustrated, the display 204 is framed by the housing 106.

The example smartphone 100 also includes other input interfaces 206 such as one or more buttons, keys or navigational input mechanisms. In the example embodiment illustrated, at least some of these additional input interfaces 206 are disposed for actuation at a front side 102 of the smartphone.

Figure 3:
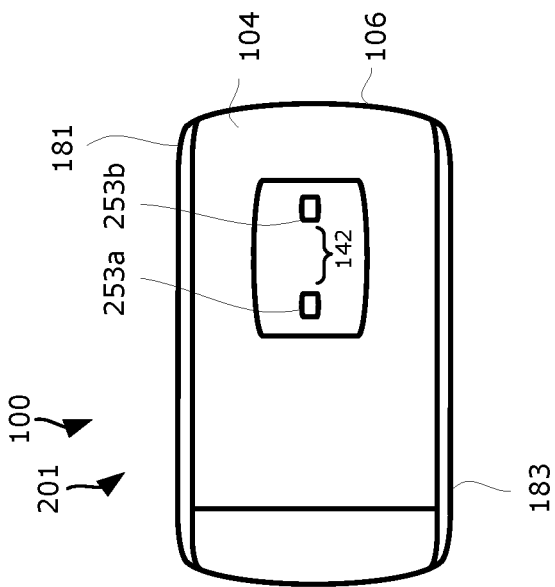
FIG. 3 is a rear view of the example smartphone of FIG. 2.

The example smartphone 100 also includes rear facing cameras 253a, 253b on a rear side 104 of the smartphone 100 which are illustrated with reference to FIG. 3, showing a rear view of the smartphone 100. That is, the rear facing cameras 253a, 253b are located on a side of the smartphone 100 which does not include the display 204. The rear facing cameras 253a, 253b may include a first camera 253a and a second camera 253b (as illustrated in FIG. 1).

The rear facing cameras may be located on a central axis of the smartphone 100 which is located midway between a top side 181 and a bottom side 183 of the electronic device 201 when the electronic device 201 is held in a landscape orientation where its width is longer than its height. The rear facing cameras 253a, 253b are located so that they may capture images of objects which are located in the rear of and/or surrounding the rear side 104 of the electronic device 201. In at least some example embodiments, the electronic device 201 may operate in one operating mode in which the display 204, on the front side 102 of the electronic device 201, acts as a viewfinder displaying image data associated with the rear facing cameras 253a, 253b on the rear side 104 of the electronic device 201.

The rear facing cameras 253a, 253b are spaced apart by a distance 142 in order to capture stereoscopic images. In at least some example embodiments, the distance 142 between the rear facing cameras 253a, 253b is greater than the distance 142 illustrated in FIG. 3. For example, the first camera 253a may be located at one end of the rear side 104 (e.g. the leftmost end illustrated in FIG. 3) of the electronic device 201 and the second camera 253b may be located at the other end of the rear side 104 of the electronic device 201 (e.g. the rightmost end illustrated in FIG. 3). A greater distance between the cameras 253a, 253b may allow for the capture stereoscopic images that produce an enhanced effect of stereoscopy for a user of the electronic device 201.

In at least some example embodiments, the smartphone 100 may also include one or more front facing cameras instead of, or in addition to, the rear facing cameras 253a, 253b. The front facing cameras may be located on the front side 102 of the smart phone 100. The front facing cameras are located so that they may capture images of objects which are located in front of and/or surrounding the front side 102 of the smartphone 100.

Allowing Selection of an Identified Object

Figure 4:
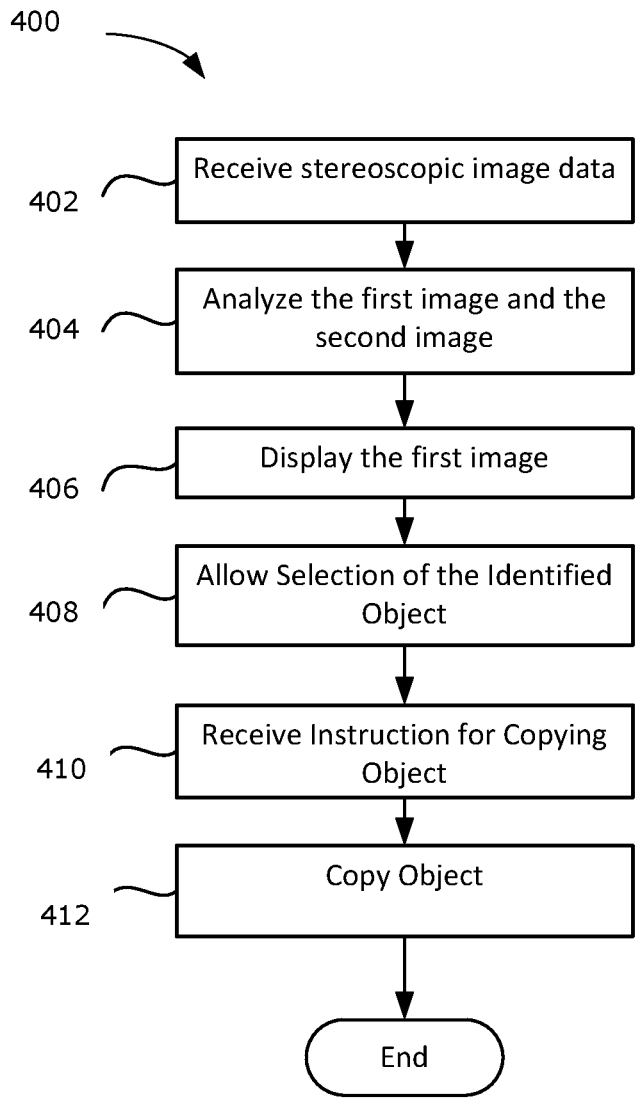
FIG. 4 is a flowchart illustrating an example method of allowing selection of an identified object in an image in accordance with example embodiments of the present disclosure.

Referring now to FIG. 4, a flowchart of an example method 400 of allowing selection of an identified object in an image is illustrated. The electronic device 201 may be configured to perform the method 400 of FIG. 4. In at least some example embodiments, the processor 240 of the electronic device 201 is configured to perform the method 400 of FIG. 4. One or more applications 225 or modules on the electronic device 201 may contain computer readable instructions which cause the processor 240 of the electronic device 201 to perform the method 400 of FIG. 4. In at least some example embodiments, the camera application 280 stored in memory of the electronic device 201 is configured to perform the method 400 of FIG. 4. More particularly, the camera application 280 may contain computer readable instructions which, when executed, cause the processor 240 to perform the method 400 of FIG. 4. It will be appreciated that the method 400 of FIG. 4 may, in at least some example embodiments, be provided by other software applications or modules apart from those specifically discussed above; for example the operating system 223. Accordingly, any features which are referred to as being performed by the electronic device 201 may be performed by any one or more of the software applications or modules referred to above or other software modules.

In at least some example embodiments, at least some of the method 400 of FIG. 4 may be performed by or may rely on other applications 225 or modules. For example, in some embodiments, an image editing application may be configured to perform the method 400 of FIG. 4. That is, an image editing application may contain computer readable instructions which, when executed, cause the processor 240 to perform the method 400 of FIG. 4.

Referring to FIG. 4, a flowchart of an example method of allowing selection of an object in an image is illustrated. At 402, the electronic device 201 receives stereoscopic image data. The stereoscopic image data includes a first image obtained from a first camera 253a and a second image obtained from a second camera 253b.

In at least some example embodiments, the stereoscopic image data may be received in response to receiving an instruction to capture an image on the first camera 253a (and/or an instruction to capture an image on the second camera 253b). In at least some embodiments, the electronic device 201 may cause the first camera 253a and the second camera 253b to capture stereoscopic image data in response to the receipt of an instruction from a user to capture a two-dimensional (i.e. non-stereoscopic) image. That is, even where a user instructs the device to capture a two-dimensional (non-stereoscopic) image, the electronic device 201 may capture stereoscopic image data. In at least some embodiments in which the camera captures stereoscopic image data in response to the receipt of an instruction to capture a two-dimensional image, the stereoscopic image data may not be used for the purposes of displaying an image in a stereoscopic mode. Rather, in at least some such embodiments, one of the captured images in the stereoscopic image data may be displayed in a two-dimensional (i.e. non-stereoscopic) mode and the other of the captured images may be used to analyze the displayed two-dimensional image. For example, as will be explained below, the second image may be used to identify objects in the first image.

Accordingly, in at least some embodiments, stereoscopic image data may be received in response to the receipt of an instruction to capture a non-stereoscopic image. The instruction may be received, for example, from an input interface 206 associated with the electronic device 201. For example, the instruction may be received from a navigational input device, such as a trackball, track pad or touchscreen display.

In at least some embodiments, in response to receiving an instruction to capture a non-stereoscopic image and/or in response to receiving an instruction to capture a stereoscopic image, the first camera 253*a* is triggered to capture a first image and the second camera 253*b* is triggered to capture a second image. In at least some example embodiments, the first image and the second image are captured simultaneously. That is, the first camera 253*a* captures the first image at the same time as the second camera 253*b* captures the second image.

In some example embodiments, the first image is not captured simultaneously as the second image. There may be a time difference between the capture of the first image by the first camera 253*a* and the second image by the second camera 253*b*. For example, the first camera 253*a* may capture the first image and subsequently the second camera 253*b* captures the second image. However, in order to ensure the stereoscopic image data is not compromised due to moving of the camera or subject, the time delay between the acquisition of the first image and the acquisition of the second image is small.

Accordingly, in some embodiments, at 402, stereoscopic image data is received from the cameras 253*a*, 253*b*. In other embodiments, the electronic device 201 may receive the stereoscopic image data from memory; for example from flash memory 244 of the electronic device 201. For example, the electronic device 201 may retrieve the first image and the second image from the data area 227 of memory. In such example embodiments, the first image and the second image may have been stored in memory of the electronic device 201 after capture of the first image by the first camera 253*a* and the second image by the second camera 253*b*.

In at least some example embodiments, the first image and the second image are two dimensional (2-D) images. For example, the first image and the second image may only include a length and a width component along a planar surface. The first image and the second image may not include a depth component along a planar surface.

After receiving the stereoscopic image data, the electronic device 201, at 404, may analyze the first image and the second image to identify an object in the first image. In at least some example embodiments, analyzing may include identifying one or more boundary associated with the object in the first image. An object may include an identifiable item, such as an individual or a thing, with one or more identifiable boundary within an image. For example, an object may include a person within an image of a landscape at the background. The electronic device 201 may identify the boundaries of the person within the image of the landscape. The boundaries may, in at least some embodiments, represent a perimeter of an object. That is, the boundary may be a continuous line which forms the boundary of a geometric figure (i.e. the object).

In at least some example embodiments, identifying boundaries may include performing image segmentation. Image segmentation is a process of partitioning an image defined by electronic signals into multiple segments, such as pixels (a pixel is the smallest unit of an image that can be represented, and is a sample of the image. Each pixel has its own address, and the address may correspond to its coordinates in relation to the image). A label is assigned to every segment in the image such that same labels share certain visual characteristics, for example, colour, intensity, texture, depth, etc. The image segmentation results in a set of segments that collectively cover the entire image. Each of the segments within a set are similar with respect to a certain visual characteristic resulting in differentiating sets of visual characteristics within the image. The differentiating sets may be used to locate boundaries of an object in an image. For example, the region of an object in an image may be identified as having a different set of visual characteristics than the rest of the regions of the image. Image segmentation may be applied to multiple images including stereoscopic images. The images are segmented and the resulting segments may be used to create 3-D reconstructions of detected objects within the images by calculating the size, density, etc. of the detected objects.

In at least example embodiments, in performing image segmentation, the electronic device 201 may use the second image to obtain depth information to identify the object in the first image. For example, the electronic device 201 may perform image segmentation based on depth information. That is, the electronic device 201 calculates depth-based characteristics and applies these characteristics as a pixel label to each pixel of a segmented first image. The depth based characteristics may be calculated by using a segmented first image and a segmented second image to obtain depth information of objects within the images. The object boundary in the first image may then be identified as the region of the object may have a different set of depth based characteristics than the rest of the regions of the image.

In at least some example embodiments, the electronic device 201 may perform edge detection in order to identify the one or more boundaries of the object. Edge detection is a process of identifying points in an image at which the image brightness has discontinuities. Discontinuities in the image brightness may correspond to discontinuities in depth, illumination, etc. of the image. Identification of the points may result in connecting lines that indicate the boundaries of objects in an image as the boundaries are areas often associated with discontinuities in image brightness in an image.

In at least some example embodiments, in performing edge detection, the electronic device 201 may use the second image to obtain depth information to identify the object in the first image. For example, the electronic device 201 may use the first image and the second image to obtain depth information of objects within the images. The depth information may then be used to identify points in the first image defining discontinuities in brightness in the first image. The identified points may form the boundaries of the object in the first image.

In at least some example embodiments, the electronic device 201 may discard the second image after analyzing the first image and the second image. For example, in at least some example embodiments, the electronic device 201 may permanently remove the second image from the electronic device 201. That is, the second image may no longer be retrievable by a user of the electronic device 201. In such example embodiments, if the second image is already stored in the electronic device 201 (for example, in the memory of the electronic device 201) prior to analyzing the first image and the second image, the camera application 280 may permanently delete the second image from the electronic device 201. That is, after having used the second image to identify one or more objects in the first image, the second image may be discarded to save space on the electronic device.

In at least example embodiments, the electronic device 201 may not permanently remove the second image from the electronic device 201. In some such example embodiments, the second image may be sent to an application, such as a recycle bin, which temporarily stores removed files. The removed files may be stored in the data area of memory being accessible by the recycle bin or other applications. A user may still retrieve the removed second image by accessing the recycle bin. In such example embodiments, if the second image is already stored in the electronic device 201 (for example, in the memory of the electronic device 201) prior to analyzing the first image and the second image, the camera application 280 sends the second image to the recycle bin.

At, at 406, the electronic device 201 displays the first image. The first image may be displayed on the display 204 of the electronic device 201. When displayed, the first image may occupy the complete display 204 or may occupy a portion of the display 204.

In at least some embodiments, the first image is displayed as a non-stereoscopic image. That is, the first image is displayed as a two-dimensional image. During the display of the first image, the second image is not used to provide a stereoscopic effect. That is, the second image is not displayed.

The electronic device 201 then, at 408, allows selection of the identified object in the first image. The identified object may be defined by the boundaries associated with the object in the first image. That is, the electronic device 201 may allow selection of the identified object in the first image using boundaries identified at 404. That is, the electronic device 201 may define the area within the boundaries as being selectable. Selection of the area within the boundaries (e.g. using an input interface 206 such as a touchscreen) may then be interpreted as being a selection of the object associated with the boundaries.

In at least some example embodiments, after allowing selection of the identified object in the first image, the electronic device 201 may receive (at 410) an instruction for copying the identified object (copying is the duplication of information). For example, the instruction may be an instruction to duplicate the identified object without removing the identified object from the first image. In at least some example embodiments, the instruction is an instruction to copy the whole object defined by its boundaries in the first image. The copying instruction may be received, for example, from an input interface 206 associated with the electronic device 201. For example, the copying instruction may be received from a navigational input device, such as a trackball, track pad or touchscreen display, or a physical keyboard associated with the electronic device 201 to instruct the electronic device 201 to copy the identified object in the first image.

In response to receiving the instruction, in at least some example embodiments, at 412, the electronic device 201 copies the identified object to an application. For example, the identified object may be duplicated without being removed from the first image. In at least some example embodiments, the object may be copied to an application that temporarily stores copied data such as files, images, objects etc., such as a clipboard.

In at least some example embodiments, the identified object may be further copied from the clipboard to other applications. For example, the identified object may be copied to an application that is capable of receiving object formats (such as JPEG, RAW, BMP etc.). For example, the application may include a word processing application, an image editing application, etc. In at least some example embodiments, the application may be located on a different device, such as a server. In such example embodiments, the electronic device 201 may interact with the server via the device subsystems such as the wireless communication subsystem 211 to copy the identified object to the application hosted by the server. For example, the electronic device 201 may copy the identified object to an online image repository, such as Picasa Web Albums™ application by Google, Inc. which may be hosted by a web server accessible via the internet.

While FIG. 4 described the use of a copy instruction for copying the object, in other embodiments, a move instruction (which may also be referred to as a "cut" instruction may be used to place the object in another location (such as in another application). Much like the copy instruction, when a move instruction is received, the object may be copied to another location. That is, 412 may be performed. However, unlike the copy instruction, when a move instruction is received, the object is removed from the first image when it is copied to the other location.

Manipulating the First Image

After an object is identified in an image, the object may, in some embodiments, be manipulated. In at least some example embodiments, manipulating may include cropping the identified object, moving the identified object and/or associating a caption with the identified object. Examples of such manipulation will now be described.

Figure 5:
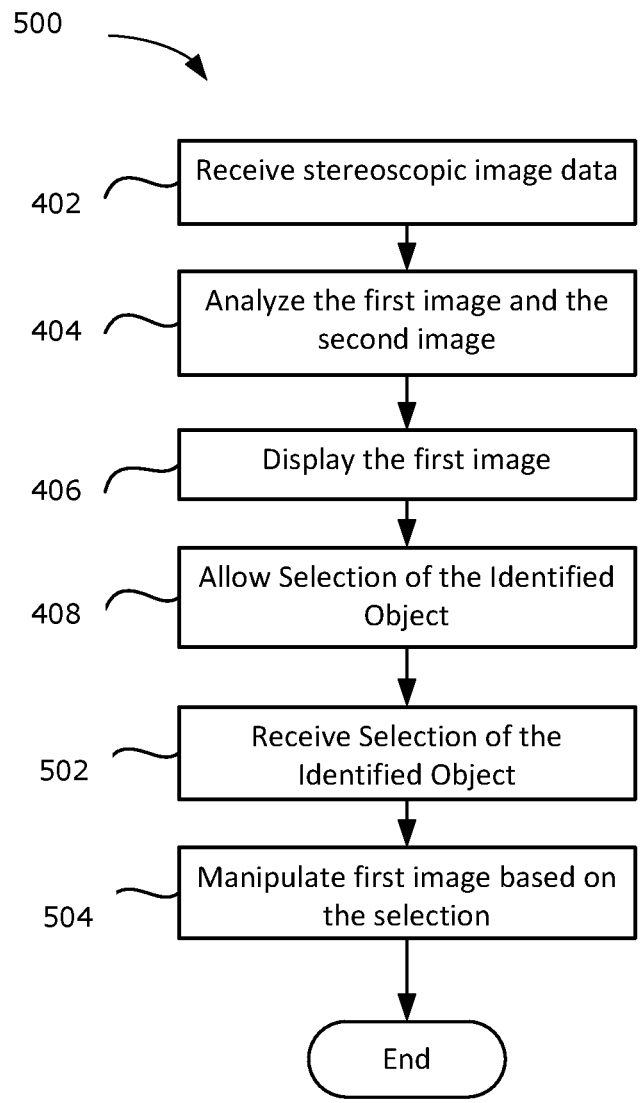
FIG. 5 is a flowchart illustrating another example method of allowing selection of an identified object in an image in accordance with example embodiments of the present disclosure.

Reference is now made to FIG. 5, which illustrates a flowchart of another example method 500 of allowing selection of an identified object. The electronic device 201 may be configured to perform the method 500 of FIG. 5. In at least some example embodiments, the processor 240 of the electronic device 201 is configured to perform the method 500 of FIG. 5. One or more applications 225 or modules on the electronic device 201 may contain computer readable instructions which cause the processor 240 of the electronic device 201 to perform the method 500 of FIG. 5. In at least some example embodiments, the camera application 280 stored in memory of the electronic device 201 is configured to perform the method 500 of FIG. 5. More particularly, the camera application 280 may contain computer readable instructions which, when executed, cause the processor 240 to perform the method 500 of FIG. 5. It will be appreciated that the method 500 of FIG. 5 may, in at least some example embodiments, be provided by other software applications or modules apart from those specifically discussed above; for example the operating system 223. Accordingly, any features which are referred to as being performed by the electronic device 201 may be performed by any one or more of the software applications or modules referred to above or other software modules.

In at least some example embodiments, at least some of the method 500 of FIG. 5 may be performed by or may rely on other applications 225 or modules. For example, in some embodiments, an image editing application may be configured to perform the method 500 of FIG. 5. That is, an image editing application may contain computer readable instructions which, when executed, cause the processor 240 to perform the method 500 of FIG. 5.

Referring to FIG. 5, a flowchart of an example method of allowing selection of an object in an image is illustrated. The method 500 includes, at 402, receiving stereoscopic image data and at 404, analyzing the first image and the second image to identify an object in the first image. The method also includes, at 406, displaying the first image, and, at 408, allowing selection of the identified object. 402, 404, 406 and 408 are discussed in greater detail above with reference to FIG. 4.

After the object is identified, at 502, the electronic device 201 receives a selection of the identified object. The selection, may be received, for example, from an input interface 206 associated with the electronic device 201. For example, the selection may be received from a navigation input device, such as a trackball, track pad or touchscreen display or a physical keyboard associated with the electronic device 201, to select the identified object. For example, in some embodiments, a user may select an object by using an input interface 206 to interact with a portion of the object which is inside the boundaries of that object. That is, selection of an object may be caused when a user selects any portion of the first image which is associated with that object.

In at least some example embodiments, the selection of the identified object includes the selection of the identified object defined by the boundaries associated with identified the object in the first image. That is, the area of the image within the boundaries associated with the identified object is selected, and the area of the image outside of the boundaries associated with the identified object is not selected.

In at least some example embodiments, selection of the identified object may graphically change the display of the identified object in the first image displayed on the display 204. For example, a selection of the associated interface element may graphically bolden, color, highlight or outline the first identified object.

After receiving selection of the identified object, the electronic device 201, at 504, manipulates the first image based on the selection of the identified object. That is, the electronic device 201 may perform an operation on the first image based on the object.

Manipulating may include varying visual features associated with the first image. That is, the first image may visually appear different after manipulation of the first image. The selected object may either be varied during the manipulation or excluded from variation during the manipulation. That is, in some embodiments, the object may be moved, rotated, resized or may have an effect applied to it (for example, by changing the color of the object, sharpening the object, darkening the object, applying a black and white effect to the object, applying a color filter to the object, applying a sepia effect to the object). In some embodiments, the object may be excluded from variation. That is, a background portion of the image (which is the portion of the image which does not include the object) may be varied and the object may be protected from the varying. For example, an effect may be applied to portions of the first image which do not include the object (for example, by changing the color of the background, sharpening the background, making the background blurry, darkening the background, applying a black and white effect to the background, applying a color filter to the background, applying a sepia effect to the background, etc.). Similarly, in some embodiments, the object may be used as the boundary for a cropping operation. That is, the object may be used in order to perform a crop operation. During a crop operation, the edges of the image may be cut based on the boundaries of the object.

The manipulation may be performed based on the boundaries of the selected object. That is, the boundaries may be used to define the portion of the image which will be manipulated. For example, in some embodiments only the portion of the image which is within the boundaries identified for an object will be manipulated. In such embodiments, the portion of the image which is outside of the boundaries may be excluded from manipulation. Thus, the boundaries may enable the object to be manipulated and the background portion of the image to be excluded.

The manipulation may occur in response to receiving specific instructions for manipulation. For example, the selected identified object may be cropped in the first image in response to the electronic device 201 receiving a cropping instruction. The instructions for manipulation may be received from an input interface 206 such as a navigational input device.

Accordingly, instructions may be received from a user (i.e. via an input interface 206) which instructs the electronic device 201 to perform a specific type of manipulation. For example, an instruction may be received at the electronic device 201 instructing the electronic device to: crop the first image based on the object, remove the identified object from the first image, move the identified object to another location in the image, assign the object to a specific layer within the image, apply an effect to the object (for example, by changing the color of the object, sharpening the object, darkening the object, applying a black and white effect to the object, applying a color filter to the object, applying a sepia effect to the object), rotating the object, and/or associating a caption with the object. Instructions for other types of manipulation of the object may be received in other embodiments.

In some embodiments, at 504, the electronic device 201 may manipulate the first image based on the selected object in accordance with user instructions.

In at least some example embodiments, the manipulated first image may be stored in the memory; for example the flash memory 244, of the electronic device 201.

Figure 6:
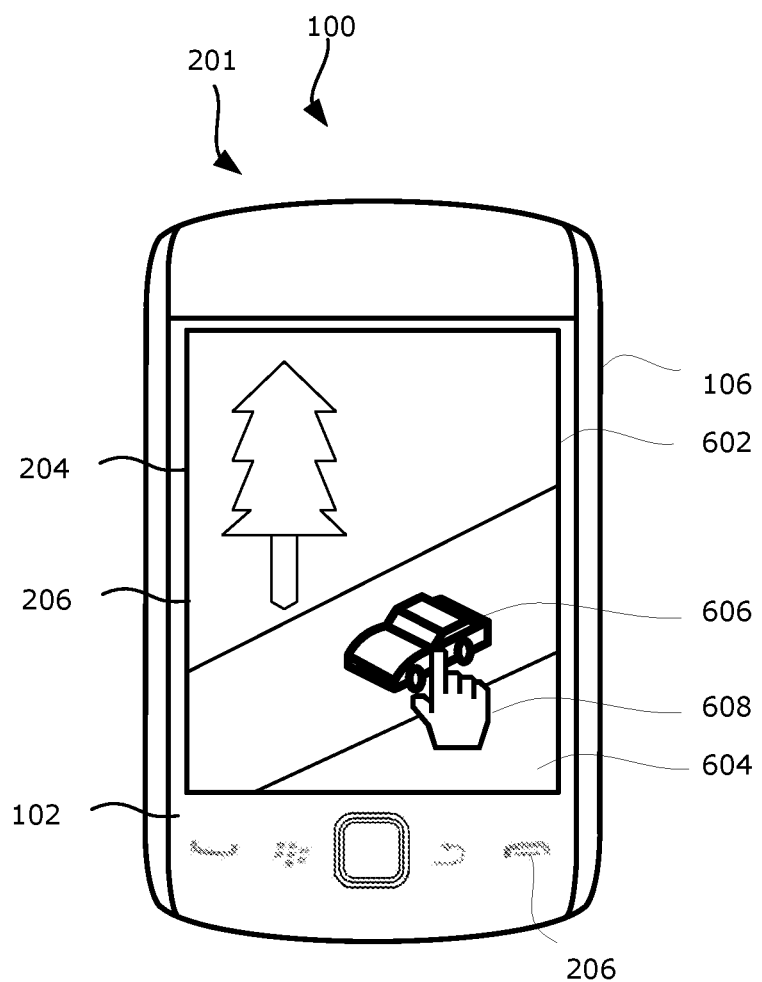
FIG. 6 is an example image displayed on the example smartphone of FIG. 2 in accordance with example embodiments of the present disclosure.

An example image and object therein will now be discussed with reference to FIG. 6. FIG. 6 shows an example image displayed on the smartphone 100 referred to in FIGS. 2 and 3. The image may be a first image 602 obtained from a first camera 253a provided by the electronic device 201. The first image includes a background 604 and an identified object 606 (for example, the car is the identified object 606, and the tree, the road and the remaining portion of the image form the background 604). The identified object 606 is defined by its boundaries within the background 604 of the first image 602.

The electronic device 201 allows selection of the identified object 606 in the first image 602. For example, in some embodiments, the object may be selected using a touchscreen display, or another input interface 206. The selection, for example, may be received by a finger 608 interacting with the display 204, which is a touchscreen display. The selection of the identified object 606 may occur when an area within the boundaries associated with the identified object 606 in the first image 602 is selected. That is, the area of the first image 602 within the boundaries associated with the identified object 606 is selected, and the area of the first image outside of the boundaries associated with the identified object 606 is not selected (for example, the area of the car within the boundaries associated with the car is selected, and the area outside of the boundaries associated with the car is not selected i.e. the background 604 which includes the tree, the road and the remaining portion of the image is not selected). The selection may be made by selecting a portion of the object and the selection may graphically change the display of the identified object 606 on the display 204 (for example, the car is selected and the selection boldens the boundaries of the car).

As noted above, the first image 602 may be manipulated based on the selection of the identified object 606. The manipulation may occur in response to receiving specific instructions for manipulation, for example, from a user of the smartphone 100 via the touchscreen display.

In at least some example embodiments, manipulating may include cropping the identified object 606a in the first image 602. In at least some example embodiments, cropping may include accentuating a specific portion of an image and removing portions of the image surrounding the specific portion. For example, cropping may include accentuating the identified object 606 and removing portions of the first image 602 surrounding the identified object 606. That is, cropping the identified object 606 may manipulate the first image 602 to accentuate the identified object 606, and the manipulated first image may include the identified object 606 as a greater portion in the manipulated image (for example, the car is accentuated and takes up a greater portion of the image in the manipulated first image than in the non-manipulated first image 602 when displayed on the display 204).

In at least some example embodiments, cropping may include varying the aspect ratio. The aspect ratio is the proportional relationship between the height and the width of an image. For example, manipulating the first image 602 by cropping the identified object 606 may vary the aspect ratio of the manipulated first image from the non-manipulated first image. That is, the manipulated first image may have a changed height and width ratio than the non-manipulated first image 602.

In at least some example embodiments, manipulating may include moving the identified object 606. The identified object 606 may be moved within the first image 602, or may be moved out of the first image 602. For example, in at least some example embodiments, the identified object 606 may be moved from its present location in the first image 602 to another location in the first image 602. That is, the manipulated first image includes the identified object 606 in a different location than the non-manipulated first image (for example, the car may be moved from being on the road in the non-manipulated first image 602 to adjacent to the road, next to the tree in the manipulated first image).

In at least some example embodiments, the selected identified object may be removed from the first image 602. That is, the manipulated first image no longer includes the identified object 606 that is included in the non-manipulated first image 602 (for example, the car may no longer be present in the manipulated first image).

In at least some example embodiments, the removed identified object 606 may be moved to an application that temporary stores data such as the clipboard (i.e. a cut function). In such example embodiments, the stored identified object 606 may be further moved to another application (i.e. a paste function) that is capable of receiving object formats (such as JPEG, RAW, BMP, etc.) for further manipulation. For example, the identified object 606 may be moved to a paintbrush application and portions of the identified object may be graphically manipulated.

In at least some example embodiments, manipulating includes associating a caption with the identified object in the first image. A caption may include text (for example, text describing the identified object in the first image). Associating a caption with the identified object 606 may include adding text to a portion of the image. For example, text may be added to the first image 602. The text may be included near the portion of the identified object 606 or in a different portion of the first image 606 (for example, the manipulated first image may include a caption above the car stating "MY CAR").

As noted in the discussion of FIG. 5 above, other types of manipulations may also be performed.

While the present application is primarily described in terms of methods, a person of ordinary skill in the art will understand that the present application is also directed to various apparatus such as an electronic device 201 including a mobile communications device. The electronic device 201 includes components for performing at least some of the aspects and features of the described methods, which may be by way of hardware components (such as the memory 244 and/or the processor 240), software or any combination of the two, or in any other manner. Moreover, an article of manufacture for use with the apparatus, such as a prerecorded storage device or other similar computer readable medium including program instructions recorded thereon, or a computer data signal carrying computer readable program instructions may direct an apparatus to facilitate the practice of the described methods. It is understood that such apparatus, articles of manufacture, and computer data signals also come within the scope of the present application.

The term "computer readable medium" as used herein means any medium which can store instructions for use by or execution by a computer or other computing device including, but not limited to, a portable computer diskette, a hard disk drive (HDD), a random access memory (RAM), a read-only memory (ROM), an erasable programmable-read-only memory (EPROM) or flash memory, an optical disc such as a Compact Disc (CD), Digital Versatile Disc (DVD) or Blu-Ray™ Disc, and a solid state storage device (e.g., NAND flash or synchronous dynamic RAM (SDRAM)).

Example embodiments of the present application are not limited to any particular operating system, system architecture, mobile device architecture, server architecture, or computer programming language.

The various embodiments presented above are merely examples and are in no way meant to limit the scope of this application. Variations of the innovations described herein will be apparent to persons of ordinary skill in the art, such variations being within the intended scope of the present application. In particular, features from one or more of the above-described example embodiments may be selected to create alternative example embodiments including a sub-combination of features which may not be explicitly described above. In addition, features from one or more of the above-described example embodiments may be selected and combined to create alternative example embodiments including a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

The invention claimed is:

1. A method, implemented by a processor of an electronic device, for manipulation of an image, the method comprising:

receiving image data, the image data including a first image obtained from a first camera and a second image obtained from a second camera, the first camera and the second camera being oriented in a common direction;

identifying a background portion in the image data by analyzing the first image and the second image to obtain depth information, wherein the analyzing includes identifying one or more boundaries associated with an object in the image data based on the depth information; and displaying a manipulated image based on the image data, wherein the manipulated image includes manipulation of the identified background portion.

2. The method of claim 1, wherein the object in the manipulated image is un-manipulated.

3. The method of claim 1, wherein manipulation of the identified background portion includes at least one of sharpening the identified background portion, blurring the identified background portion, applying a colour effect to the identified background portion, and applying a black-and-white effect to the identified background portion.

4. The method of claim 1, wherein identifying the background portion includes identifying discontinuities in visual characteristics associated with the object in the first image.

5. The method of claim 1, wherein the image data is stereoscopic image data, the stereoscopic image data includes the first image obtained from the first camera and the second image obtained from the second camera, and wherein the first image and the second image are simultaneously obtained.

6. The method of claim 5, wherein the stereoscopic image data is received in response to receiving an instruction to capture a non-stereoscopic image.

7. The method of claim 1, wherein identifying the one or more boundaries includes performing image segmentation.

8. The method of claim 7, wherein performing image segmentation includes:
partitioning the image data into image segments;
assigning a visual characteristic label to each of the image segments;
grouping the image segments based on the visual characteristic labels to identify groups of image segments sharing visual characteristics; and
identifying the one or more boundaries based on the identified sets of visual characteristics.

9. The method of claim 8, wherein the respective image segments are individual pixels.

10. The method of claim 1, further comprising discarding the second image from the electronic device subsequent to displaying the manipulated image.

11. The method of claim 1, further comprising:
receiving a signal indicating a selection of at least one of the background portion or the object; and
in response to receiving the signal, copying the indicated selection to an application.

12. An electronic device comprising:
a memory;
a display;
a first camera and a second camera, the first camera and the second camera being oriented in a common direction; and
a processor coupled to the memory, the display, the first camera, and the second camera, the processor being configured to:

receive image data, the image data including a first image obtained from the first camera and a second image obtained from the second camera;
identify a background portion in the image data by analyzing the first image and the second image to obtain depth information, wherein the analyzing includes identifying one or more boundaries associated with an object in the image data based on the depth information; and
display a manipulated image based on the image data, wherein the manipulated image includes manipulation of the identified background portion.

13. The electronic device of claim 12, wherein the object in the manipulated image is un-manipulated.

14. The electronic device of claim 12, wherein manipulation of the identified background portion includes at least one of sharpening the identified background portion, blurring the identified background portion, applying a colour effect to the identified background portion, and applying a black-and-white effect to the identified background portion.

15. The electronic device of claim 12, wherein identifying the background portion includes identifying discontinuities in visual characteristics associated with the object in the first image.

16. The electronic device of claim 12, wherein the image data is stereoscopic image data, the stereoscopic image data includes the first image obtained from the first camera and the second image obtained from the second camera, and wherein the first image and the second image are simultaneously obtained.

17. The electronic device of claim 16, wherein the stereoscopic image data is received in response to receiving an instruction to capture a non-stereoscopic image.

18. The electronic device of claim 12, wherein identifying the one or more boundaries includes performing image segmentation.

19. The electronic device of claim 18, wherein performing image segmentation includes the processor being configured to:
partition the image data into image segments;
assign a visual characteristic label to each of the image segments;
group the image segments based on the visual characteristic labels to identify groups of image segments sharing visual characteristics; and
identify the one or more boundaries based on the identified sets of visual characteristics.

20. A non-transitory, tangible computer readable storage medium encoded with computer executable instructions, wherein execution of the computer executable instructions is for:
receiving image data, the image data including a first image obtained from a first camera and a second image obtained from a second camera, the first camera and the second camera being oriented in a common direction;
identifying a background portion in the image data by analyzing the first image and the second image to obtain depth information, wherein the analyzing includes identifying one or more boundaries associated with an object in the image data based on the depth information; and
displaying a manipulated image based on the image data, wherein the manipulated image includes manipulation of the identified background portion.

* * * * *